(12) United States Patent
Jakobsson

(10) Patent No.: US 6,687,822 B1
(45) Date of Patent: Feb. 3, 2004

(54) METHOD AND SYSTEM FOR PROVIDING TRANSLATION CERTIFICATES

(76) Inventor: Markus Bjorn Jakobsson, 161 Newark St., #4a, Hoboken, NJ (US) 07030

( * ) Notice: Subject to any disclaimer, the term of this patent is extended or adjusted under 35 U.S.C. 154(b) by 0 days.

(21) Appl. No.: 09/330,194

(22) Filed: Jun. 11, 1999

(51) Int. Cl.$^7$ ................................................. H04L 9/00
(52) U.S. Cl. ........................ 713/156; 713/158; 713/175
(58) Field of Search ................................. 713/156, 158, 713/175

(56) References Cited

U.S. PATENT DOCUMENTS

| | | | | |
|---|---|---|---|---|
| 5,315,657 | A | * 5/1994 | Abadi et al. ................ 713/201 |
| 5,422,953 | A | * 6/1995 | Fischer ........................ 713/172 |
| 5,511,121 | A | * 4/1996 | Yacobi ......................... 705/69 |
| 5,664,017 | A | * 9/1997 | Gressel et al. ............... 380/30 |
| 5,784,463 | A | * 7/1998 | Chen et al. .................. 713/171 |
| 6,052,467 | A | * 4/2000 | Brands ......................... 380/279 |
| 6,178,409 | B1 | * 1/2001 | Weber et al. ................ 705/79 |
| 6,282,295 | B1 | * 8/2001 | Young et al. ................. 380/286 |
| 6,292,897 | B1 | * 9/2001 | Gennaro et al. ............. 713/175 |
| 6,341,164 | B1 | * 1/2002 | Dilkie et al. ................ 380/278 |
| 6,408,388 | B1 | * 6/2002 | Fischer ........................ 713/176 |
| 6,418,421 | B1 | * 7/2002 | Hurtado et al. ............. 705/54 |

* cited by examiner

*Primary Examiner*—Gilberto Barron
*Assistant Examiner*—Kambiz Zand

(57) ABSTRACT

A method for providing publicly verifiable translation certificates comprising the steps of receiving an input encryption having a first secret key; outputting an output re-encryption of the input encryption, the output re-encryption having a second secret key; and generating a translation certificate that proves the input encryption and the output re-encryption are encryptions of an identical message, wherein the first secret key and the second secret key do not need to be, but are allowed to be, equal. This method and system for generating translation certificates in quorum controlled asymmetric proxy encryptions has uses, including but not limited to, Internet applications and specifically to E-mail systems. The scheme, which can use either an ElGamal encryption, an ElGamal encryption based on Elliptic Curves or an ElGamal related encryption algorithm, leaks no information as long as there is no dishonest quorum of proxy servers and produces a small, publicly verifiable translation certificate, that is independent of the number of prover servers involved in the re-encryption.

33 Claims, 4 Drawing Sheets

METHOD AND SYSTEM FOR PROVIDING TRANSLATION CERTIFICATES

TECHNICAL FIELD

This invention relates to a method of and system for providing publicly verifiable translation certificates that verify that an output encryption of a plaintext message corresponds to the input encryption of the same plaintext message. Translation certificates can be used in quorum controlled asymmetric proxy cryptography for encrypting and decrypting transcripts, with particular usefulness for Internet and E-mail applications.

BACKGROUND OF THE INVENTION

With the increasing importance of encryption methods for privacy and protection of business secrets, and with an increasing need for a flexible infrastructure, I foresee the need for many new secure and flexible primitives extending the basic communication and encryption capabilities available today. One such primitive is proxy re-encryption, which Blaze et al. introduce in M. Blaze, G. Bleumer, M. Strauss, "Atomic Proxy Cryptography," *EUROCRYPT* '98, pp. 127–144. Proxy re-encryption is a translation between ciphertexts from one encryption key to another encryption key. It can be used to forward encrypted messages without having to expose the cleartexts to the participants involved, a primitive with many potential commercial uses.

In symmetric proxy encryption, which was exhibited by Blaze et al., the proxy (that is, the entity performing the translation) needs to know the secret keys associated with both the incoming and outgoing transcripts, or some linear combination of these. On the other hand, in asymmetric proxy re-encryption, it is not necessary for the proxy to know the secret key corresponding to the produced ciphertext. This is, therefore, a setting that is more realistic and practical than the symmetric setting.

The shortcomings of existing E-mail systems are well known, for example, in one existing E-mail system incoming E-mail messages are protected with a public key encryption and sent directly to the primary recipient's mailbox. A problem with this scheme arises when the primary recipient leaves or is absent for an extended period of time and E-mails sent to the primary recipient are needed. In this instance, the contents of the E-mails can not be accessed by any other users, unless they have the absent primary recipient's secret key. Thus, the information contained in these E-mails, regardless of how urgently it is needed or vitally important it is to an organization is inaccessible until the primary recipient returns or the primary recipient's secret key is obtained.

Another existing E-mail system uses a single system administrator to distribute incoming E-mail messages to the intended primary recipients. This configuration can experience similar problems with those of the above described system if, for example, distribution of the E-mail is controlled by a single system administrator with the secret key and this system administrator leaves or is absent. In addition, in this system, the system administrator has total, unrestricted access to all E-mail messages in the system. While the problem of a missing system administrator can be overcome by having multiple E-mail system administrators (all of whom possess knowledge of the secret key), it multiplies the security problems by increasing the number of people who have unrestricted access to the E-mail system and, thus, makes confidential communications between parties less secure.

In another existing E-mail system, a group of system administrators are needed to distribute the E-mail. Incoming E-mail can be decrypted by the group of system administrators only if the entire group agrees and each uses their portion of the secret key to decrypt their associated portion of the E-mail message. Therefore, if an E-mail message in the primary recipient's mailbox needs to be forwarded on, and the primary recipient is not available, all of the group of system administrators must decrypt their respective portions of the message, combine the results, and then forward the message to the necessary secondary recipients. A major problem with this system is that all of the system administrators must be available and once the decryption is finished, each system administrator in the group of system administrators has unrestricted access to the complete E-mail message.

Finally, in an existing symmetric proxy encryption system the proxy holds a key that allows the proxy to transform the transcripts, but which also allows the proxy to compute the secret key of the secondary recipient, given knowledge of the proxy's own secret key. This, also, allows the secondary recipient to compute the secret key of the primary recipient or proxy server in a similar manner. This type of proxy encryption is disadvantageous in situations where there is no symmetric trust (or little trust at all). It also forces the participants to establish the shared transformation key ahead of time. The only advantage of a solution of this type appears to lie mainly in a potential improvement in efficiency, caused by the merging of the two decrypt and encrypt operations into one re-encryption operation performed during the transformation phase.

In my prior U.S. application Ser. No. 09/222,716, which is expressly incorporated by reference as to its entire content, I proposed a proxy encryption system which overcomes the disadvantages of the prior art systems. In this prior application I demonstrated how to implement quorum controlled asymmetric proxy re-encryption to guarantee that there is no dishonest quorum, that a plaintext message whose encryption is being transformed is not revealed to the proxy servers, and introduced the concept of verifying that the output encryption of a plaintext message corresponds to the input encryption of the same plaintext message.

All of the above techniques and systems fail to provide for the use of publicly verifiable translation certificates to verify the output encryption of a plaintext message corresponds to the input encryption of the same plaintext message without revealing the input encryption to either a subset of proxy servers or verifiers, in general, and the use of translation certificates in a quorum controlled asymmetric proxy re-encryption system, in particular. Therefore, there is a need for a system and new techniques to provide translation certificates for use in encrypting and decrypting transcripts.

SUMMARY OF THE INVENTION

My invention demonstrates how to use translation certificates to implement a quorum controlled asymmetric proxy re-encryption system to guarantee that there is no dishonest quorum and that the plaintext message whose encryption is being transformed is not revealed to the proxy servers.

My invention implements the use of publicly verifiable translation certificates in quorum controlled asymmetric proxy re-encryption systems. A proxy is an entity that is composed of one or more individuals called proxy servers. In my invention, a publicly verifiable translation certificate is generated by the "proxy servers" after they transform a transcript from being associated with a primary recipient to afterwards being associated with at least one secondary recipient. In one embodiment of the present invention, a quorum of proxy servers is selected from the available group of proxy servers to perform the transformation function and generate the translation certificate. The "quorum of proxy servers" can consist of any and all sufficiently large subsets of proxy servers from the group of proxy servers as described in detail in copending U.S. application Ser. No. 09/222,716. The exact membership of the quorum does not need to be identified until the time of the transformation, however, the minimum number of members in the quorum must be specified by the primary recipient before the secret key is shared among a quorum of the proxy servers. For example, in a group of five (5) proxy servers, if the primary recipient specified that a minimum of three (3) proxy servers would constitute a quorum, then the weighting necessary to decrypt the secret key would be dynamically determined so that any three of the currently available proxy servers would be able to decrypt the secret key, perform the necessary functions on the ciphertext, and generate the translation certificate. While, in the present invention, the proxy is intended to consist of more than one proxy server, the present invention is still applicable to a single proxy server.

I focus on asymmetric proxy re-encryption, where for security, the transformation and generation of the translation certificate is performed under quorum control by a quorum of proxy servers. This guarantees that if there is not a dishonest quorum, then a valid translation certificate is generated and the plaintext message whose encryption is being transformed is not revealed to the proxy servers. My solution is publicly verifiable, compact, and does not leak any information about the plaintext to any of the verifiers who verify the honesty of the participating proxy servers or to a subset of the proxy servers.

There are two types of asymmetric proxy transformations in which to implement translation certificates. In the first, which is merely theoretical, the message of the initial encryption can be hidden from the proxy by not requiring the proxy to know the decryption key corresponding to the proxy's own public key (but where the proxy is still able to perform the transformation). In the second, in which the proxy is distributed and all actions are quorum controlled, the message of the encryption is hidden from a "sufficiently honest" proxy. The second, in which the control is held by a quorum of proxy servers, has efficient solutions and I elaborate on such an embodiment herein.

A partial result of this proxy re-encryption system is the generation of a transcript from a non-interactive proof, that proves the correct translation between encryptions was performed, that is, that the incoming and outgoing encryptions indeed encrypt the same message. The transcript, which I call a translation certificate is publicly verifiable, is compact (using standard security parameters ($|p|=1024$ and $|q|=160$), it is a mere 396 bytes long and is generated independently of the number of provers), and does not leak any information about the plaintext to the verifiers or to a subset of the provers.

Consequently, my method and system for providing publicly verifiable translation certificates solves the above-mentioned deficiencies in the prior art system. My method and system involves receiving an input encryption having a first secret key; then outputting an output re-encryption of the input encryption, where the output re-encryption has a second secret key; and then generating a translation certificate that verifies that the input encryption and the output re-encryption are encryptions of an identical message, with respect to a first and a second public key.

Such a mechanism is useful in many applications. For example:

It allows the proxy to transform encrypted messages to encryptions with a variety of different recipient public keys, to allow for categorization of the encryptions. The categorization may be performed either as a function of the transcripts and their origins, randomly (for example, assigning an examiner to an electronically submitted patent), or as a function of time, and may be used to sort the encrypted messages according to priority or security clearance.

It allows more efficient communication to a large number of recipients that are physically clustered around the proxy; the sender would only need to send one encryption, along with an authenticated list of recipients. This may prove very useful for pay-tv, general multi-cast, and related applications.

It can be used for escrow encryption to separate the power of who can transform an encrypted message into a new transcript and who can read the plaintext message corresponding to such a transcript.

Lastly, I believe that asymmetric proxy encryption may become a useful building block in the design of secure and efficient multi-party protocols.

DETAILED DESCRIPTION

Figure 1:
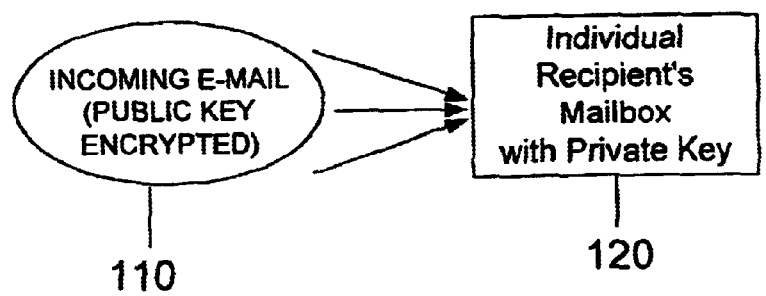
FIG. 1 illustrates a prior art E-mail system without system administrator distribution of E-mail to the recipients.

FIG. 1 shows a prior art E-mail system 100 without system administrator distribution of E-mail and where each recipient in the system is the sole possessor of their secret key. Incoming E-mail 110 with a public key encryption is sent directly to the primary recipient's mailbox 120. A problem with this scheme arises when the primary recipient leaves or is absent for an extended period of time and the E-mail sent to the primary recipient is needed. In this instance, the contents of the E-mails can not be accessed by any other users, unless they have the absent primary recipient's secret key.

Figure 2:
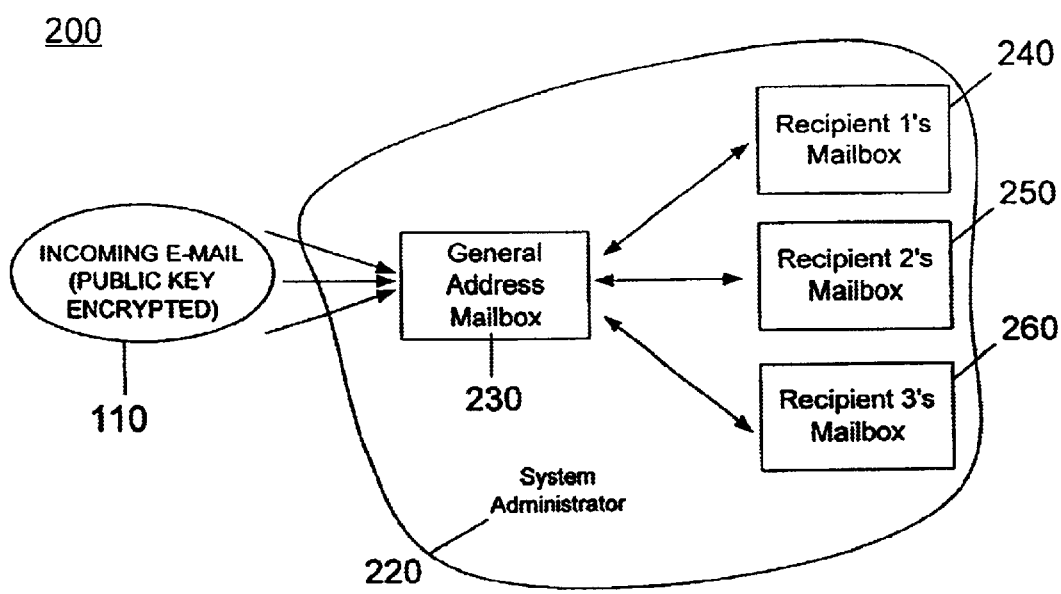
FIG. 2 illustrates another prior art E-mail system with a single system administrator distribution of E-mail to the recipients.

FIG. 2 shows another prior art E-mail System 200 with a single system administrator 220 distribution of E-mail where incoming E-mail 110 is sent to a general address mailbox 230 and then distributed to the individual recipient's mailboxes 240, 250 and 260 by the system administrator 220 with the necessary secret key. This configuration can experience similar problems with those of the system in FIG. 1 if, for example, distribution of the E-mail is controlled by a single system administrator 220 with the secret key and this system administrator 220 leaves or is absent. While this problem can be overcome by having multiple E-mail system administrators (all of whom possess knowledge of the secret key), it creates new security problems by increasing the number of people who have unrestricted access to the E-mail system and, thus, makes confidential communications between parties less secure.

Figure 3:
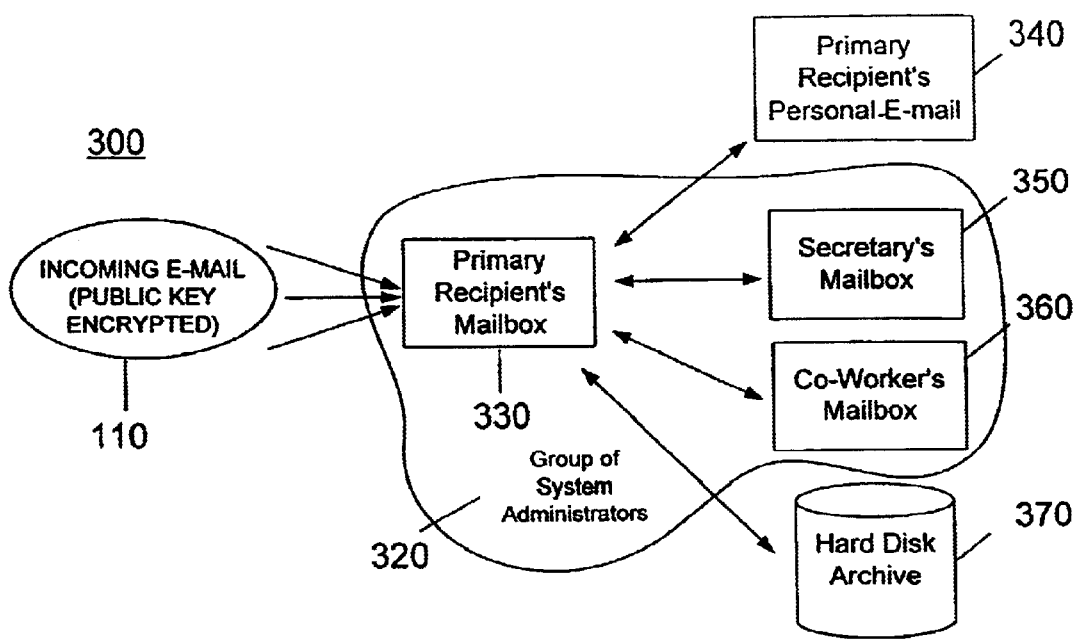
FIG. 3 illustrates a prior E-mail system with a group of system administrators distributing the E-mail to the recipients.

FIG. 3 shows another prior art E-mail system 300 with a group of system administrators 320 all being needed to distribute the E-mail. Incoming E-mail 110, which is public key encrypted, is sent to the primary recipient's mailbox 330. In this configuration a group of system administrators 320 runs the E-mail system 300. Each system administrator only has a portion of the secret key needed to decrypt the primary recipient's E-mail messages. Incoming E-mail 110 can be decrypted by the group of system administrators 320 only if the entire group agrees and each uses their portion of the secret key to decrypt their associated portion of the E-mail message 110. Therefore, if an E-mail message 110 in the primary recipient's mailbox 330 needs to be forwarded on, and the primary recipient is not available, all of the group of system administrators 320 must decrypt their respective portions of the message, combine the results, and then forward the message to the necessary secondary recipients. In FIG. 3, for example, these secondary recipients can include an external individual recipient's personal E-mail address 340, an internal secretary's mailbox 350, an internal co-worker's mailbox 360, and/or an external (local or network) harddisk archive 370. A major problem with this system is that all of the system administrators must be available and once the decryption is finished, each system administrator in the group of system administrators 320 has unrestricted access to the complete E-mail message 110. It is also important that the decrypted message be re-encrypted since the message may be susceptible to eavesdroppers when it is sent outside of the organization over an insecure channel, for example, to the primary recipient's personal E-mail 340 at the primary recipient's home.

The deficiencies in the early prior art encryption schemes spurred the development of proxy encryption schemes. "Proxy encryption" or "proxy cryptography" involves a proxy, an entity other than the primary recipient, having a key that enables the proxy to transform transcripts from being associated with the primary recipient to afterwards being associated with at least one secondary recipient. The proxy is comprised of one or more individuals called proxy servers who perform the transcript transformation. In one embodiment of the present invention, a quorum of proxy servers is selected from an available group of proxy servers to perform the transformation function. The "quorum of proxy servers" can consist of any and all non-empty subsets of proxy servers from the group of proxy servers. While, in the present invention, the proxy is intended to consist of more than one proxy server, the present invention is still applicable to a single proxy server.

Alternative systems to overcome the deficiencies in the prior art using proxy cryptography will now be discussed in some detail.

There are three possible settings for asymmetric proxy encryption, and these are discussed below.

The first setting is a theoretical asymmetric setting in which the proxy can only transform transcripts and is not able to decrypt the transcripts by himself. Obviously, this requires a pre-computation phase in which some transformation key is established between the proxy and the primary recipient; otherwise, the existence of such a transformation algorithm would constitute an attack on the corresponding encryption scheme, as it would allow the proxy to transform an encryption which the proxy could not decrypt into an encryption for which the proxy holds the secret key (since the assumption is that the proxy can transform transcripts to be associated with an arbitrary public key of a given format.) In addition to the necessity of a pre-computation phase, a second shortcoming of this setting is that there is no known practical solution for it. Clearly, it is theoretically possible to construct a transformation algorithm of this type: For example, let the two parties, the proxy and the primary recipient, engage in a secure multi-party computation in which the proxy receives a "dictionary" of transformation pairs. Note that this can be generated without knowledge of the secret key corresponding to the proxy's public key if for each possible output transcript (which is readable by the secondary recipient), the corresponding input transcripts are constructed. In a second phase, the proxy would simply look up the transformation of any transcript using this dictionary. However, this type of solution appears to generate exponential-sized transformation keys in the size of the input strings for all known encryption schemes.

The second setting also uses a theoretical asymmetric proxy encryption, where the proxy is one physical party, and the proxy has the key that allows him to decrypt the transcript. Such a solution requires a certain amount of trust, since the proxy is able to read the messages sent to the primary recipient. Therefore, this type of solution appears to be advantageous mainly as a means for speed-up due to merging the decrypting and encrypting operations into one operation.

Finally, my third setting, which is embodied in the present invention, is an asymmetric setting like the above, but where the proxy is distributed and the transformation is controlled by the use of quorum action. In this setting, it is not necessary to trust the proxy: the primary recipient only has to trust that there is no dishonest quorum of proxy servers. A solution of this type requires no pre-computation, can hide the message from the quorum of proxy servers, and therefore, adds functionality in a less stringent trust model.

Figure 4:
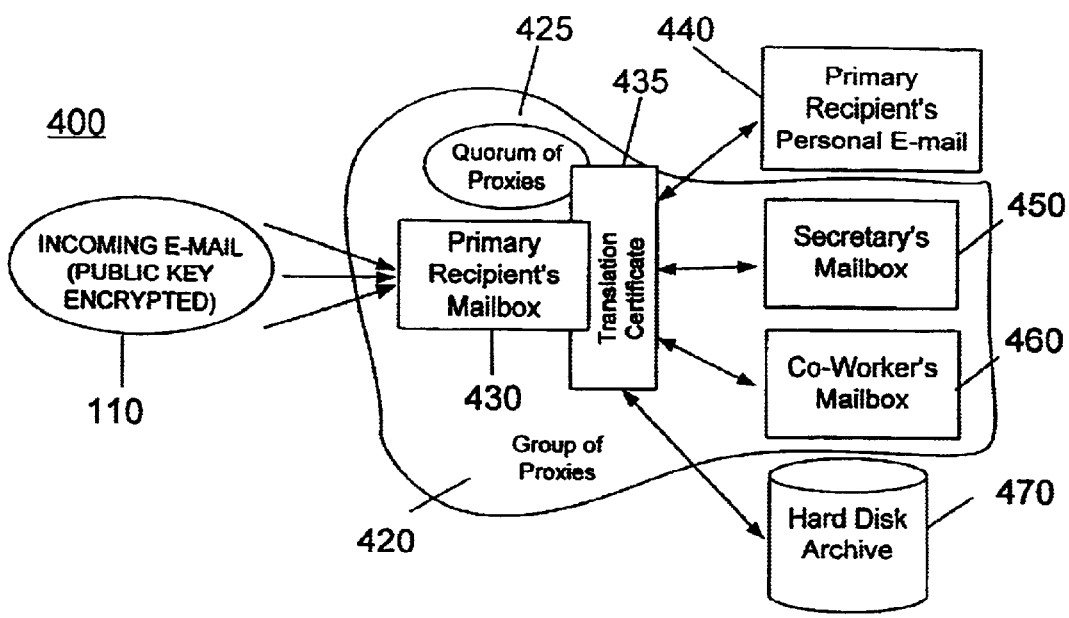
FIG. 4 illustrates an E-mail system in which an embodiment of the inventive method may be practiced and which is exemplary of other communication systems in which the inventive method may also be practiced.

FIG. 4 shows an E-mail system 400 in which an embodiment of the inventive asymmetric proxy encryption method may be practiced. The E-mail system 400 depicted in FIG. 4 is representative of communication systems generally and may not be representative of each and every existing communication system. However, one of ordinary skill in the art may adapt the teachings from the following discussion to encompass each E-mail or other communication system that is adapted to employ a quorum controlled proxy encryption system of the present invention. In general, the E-mail or other communication system is implemented on a programmable computer system that is connected, via communication lines, to other programmable computer systems. The processing for the quorum controlled proxy encryption system is performed either as a centralized system or as a distributed system. The greatest security is achieved in the distributed system. In FIG. 4, incoming E-mail 110, which is public key encrypted, is sent to a primary recipient's mailbox 430. In this system there is also a group of proxy servers 420 (system administrators) who maintain the E-mail system 400. From the group of proxy servers 420 a quorum of proxy servers 425 is selected to act as the proxy. One of the functions of the quorum of proxy servers 425 involves forwarding E-mail from a primary recipient's mailbox 430 to some number of secondary recipients when the primary recipient is unavailable. However, before the proxy servers 425 can forward E-mail from the primary recipient's mailbox 430 to any of the secondary recipients, the proxy servers must first generate a newly encrypted version of the primary recipient's E-mail with an associated translation certificate 435 and verify that the translation certificate 435 is correct. The choice of secondary recipients can be made according to rules that specify, for example, that all E-mail from a certain sender always gets routed to a certain secondary recipient; at random; according to the time and date; or according to other rules, which may involve routing information sent by the sender with the encrypted message. These locations can be either internal or external to the E-mail system 400. For example, if the primary recipient is on vacation or home sick, then the primary recipient could have the quorum of proxy servers 425 forward the E-mail to the primary recipient's home E-mail address 440, a secretary's mailbox 450, a coworker's mailbox 460, and/or archived to a local or network harddisk 470.

In general, to perform the forwarding function, a proxy must be able to transform a transcript (for example, an encrypted E-mail message 110) from being associated with the primary recipient to instead being associated with the secondary recipient. In this system the proxy only needs to know the primary recipient's secret key, or some transformation key derived from the primary recipient's secret key. In this embodiment of the present invention, since the proxy is distributed among a quorum of proxy servers, the transformation is controlled by the use of quorum action. Also, in this embodiment, the actual E-mail message remains hidden from the quorum of proxy servers, provided the entire quorum remains honest and does not, as a group, decrypt and read the message in the transformed E-mail. While the exact membership of the quorum does not need to be identified until the time of the transformation, the minimum number of members in the quorum must be specified by the primary recipient before the secret key is shared among a quorum of the proxy servers. In one embodiment, at the time of transformation, each participating proxy server computes an unweighted transcript using the proxy server's unweighted share of the allocated secret key. Then, based on which proxy servers actually participated, the unweighted transcripts are first Lagrange-weighted and then combined into the final transcript and a translation certificate 435 is generated. In another embodiment, at the time of transformation, each participating proxy server computes a new, Lagrange-weighted share from the proxy server's existing share after learning which servers are participating. For example, in a group of five (5) proxy servers, if the primary recipient specified that a minimum of three (3) proxy servers would constitute a quorum, then the weighting necessary to decrypt the secret key would be dynamically determined so that any three of the currently available proxy servers would be able to decrypt the secret key and perform the necessary functions on the cyphertext. Similarly, if the primary recipient had specified that a minimum of four (4), five (5) or more proxy servers would constitute a quorum, the secret key would be shared between the specified proxy servers in the same manner as described above. In the above example of three proxy servers, if four proxy servers come together and each produce transcripts, then one of them can be ignored and the final transcript is produced from the other three.

To transform the E-mail message to permit it to be forwarded on to secondary recipients, each proxy server in the quorum uses the part of the primary recipient's secret key assigned to that proxy server in the quorum to transform a part of the message. This transformation process can occur either in parallel or serially. Additional security can be achieved by using proactive secret sharing schemes. These "proactive secret sharing schemes" alter the individual proxy server shares during every time period in a manner that does not change what secret is shared, but prevents mobile attackers from learning any information from any corrupted proxy servers. A "mobile attacker" is an attacker that can corrupt a certain portion of a set of proxy servers for each time period, and for each time period can choose a new set of proxy servers to corrupt.

If the transformation is done in parallel, each proxy server in the quorum transforms an identical copy of the primary recipient's message and then the separate transforms are combined into the final re-encrypted message and the translation certificate 435 is generated. If done serially, each proxy server in turn transforms the results passed to it from the previous proxy server with the exception of the first proxy server who transforms the original primary recipient's message. In the serial mode, the proxy servers can transform the encrypted message in any order, for example, with a quorum of three proxy servers the transformation can be performed in 3 factorial (3!) or six (6) different orders. In both the serial and parallel methods, after the final proxy server has finished transforming the message, the final re-encrypted version of the message and the translation certificate 435 exist. While the translation certificate 435 shown in FIG. 4 appears to be connected to the primary recipient's mailbox 430, it is merely illustrated in this manner to indicate where the translation certificate 435 is operative in the overall process of forwarding the primary recipient's message. In one embodiment of the present invention, the translation certificate 435 is directly associated with the primary recipient's message, the newly encrypted E-mail, the first public key, and the second public key. This association can be implemented in, but not limited to, a data structure record format using a standard field arrangement, table or similar data structure, or hardware memory devices to store and reference the appropriate storage locations of each piece of information. It will be apparent to those skilled in the art that there are numerous embodiments of how the translation certificate can be implemented in addition to those specifically described above.

The following discussion provides the necessary assumptions and requirements for and proof of my invention.

The proxy, whose public key is $y_1$, receives a transcript $E_1$, which can be an ElGamal, or an ElGamal encryption based on Elliptic Curves or an ElGamal related encryption for which my principles can be applied of a message m using $y_1$ which meets the criteria set forth below for a representative encryption algorithm. The proxy produces and outputs a transcript $E_2$, which is, for example, an ElGamal encryption, an ElGamal encryption based on Elliptic Curves or an ElGamal related encryption for which my principles can be applied of the same message m, but using a given public key $y_2$.

The transformation is controlled by the use of quorum actions. Assume that there is no set of cheating proxy servers containing a quorum and make the following commonly employed computational assumption:

The Decision Diffie-1-Hellman Assumption. Let $p=2q+1$, for primes p and q, and let m, g be generators of a subgroup of order q. Then, the pairs $(m, m^x, g, g^x)$ and $(m, m^r, g, g^x)$ are indistinguishable, for random and unknown values $r, x \in Z_q$, $m, g \in G_p$.

Informally, the requirements on my scheme are:
1. Correctness: Any quorum Q of proxy servers, sharing a secret key $x_1$, will be able to perform the above re-encryption.
2. Robustness: If any proxy server in the transformation protocol outputs incorrect transcripts, then all honest proxy servers will detect the incorrect transcripts. The protocol will allow the honest proxy servers to determine which proxy servers cheated.

3. Public Verifiability. Anybody must be able to verify that the correct transformation was performed, without knowledge of any secret information. The corresponding proof, the translation certificate, must be compact and be verifiable without interaction.

4. Asymmetry: The above proxy servers need no information about the secret key $x_2$ corresponding to the secondary receiver's public key $y_2$ in order to perform the computation, and the secondary receiver will need no information about $x_1$ or $y_1$ in order to decrypt $E_2$.

5. Privacy: The proxy re-encryption does not leak any information about m to any set of proxy servers smaller than a quorum of proxy servers.

Let us review some basic definitions:

Public and Secret Information. Let p, q be primes such that $p=2q+1$, and g be a generator of $G_p$. The quorum of proxy servers share a secret key $x_1$ using a (k,n) threshold scheme; their corresponding public key is $y_1=g^{x_1} \bmod p$. (From this point on, assume all arithmetic to be modulo p where applicable, unless otherwise stated.) Likewise, the secondary recipient has a secret key $x_2$ with a corresponding public key $y_2=g^{x_2}$.

ElGamal. One embodiment of my protocol uses ElGamal encryption. To encrypt a value m using the public key y (where, $m=(M/p)M$ for an original message $M \epsilon [1 \ldots (p-1)/2]$ and where (M/p) is the Jacobi symbol of Ad), a value $\gamma \epsilon_u Z_q$ is picked uniformly at random, and the pair (a, b)=$(my^\gamma, g^\gamma)$ is calculated. Thus, (a, b) is the encryption of m. In order to decrypt this and obtain m, $m=a/b^x$ is calculated.

Consider a situation where there are two secret keys, $x_1$ and $x_2$, corresponding to the public keys $y_1$ and $y_2$, respectively, for $y_i = g^{x_i}$. The holder of the secret keys receives as input two messages $m_1$ and $m_2$, and outputs the "signature" $s = m_1^{x_1} m_2^{x_2}$. Let us consider how the holder can efficiently prove that the output is correct, without revealing either $m_1^{x_1}$ or $m^{2x_2}$. (Note: if these values could be revealed, then a standard proof of a valid undeniable signature could be used, or related methods based on signature schemes, for example, Schnorr signatures.) In the protocol below, the "verifier" is a proxy server in the quorum of proxy servers and is subsequent to the prover. The "prover" is the proxy server who just performed the last transformation on the encrypted message.

Consider the following protocol:

1. The verifier knows (g $y_1$, $y_2$, $m_1$, $m_2$, s). The verifier selects three values $\alpha$, $\beta_1$, $\beta_2$ independently and uniformly at random from $Z_q$, and computes $(q_1,q_2)=(m_1^\alpha g^{\beta_1}, m_2^\alpha g^{\beta_2})$. This pair is sent to the prover.
2. The prover computes $w=q_1^{x_1} q_2^{x_2}$, and sends a commitment c to w to the verifier.
3. The verifier sends ($\beta$, $\beta_1$, $\beta_2$) to the prover.
4. The prover verifies that ($q_1$, $q_2$) were correctly computed (and halts if they were not), and sends w to the verifier.
5. The verifier accepts if $w = s^\alpha y_1^{\beta_1} y_2^{\beta_2}$, otherwise the verifier rejects.

The above protocol is correct, sound, and zero-knowledge. In addition, the above protocol can be made non-interactive using standard methods related to those of Schnorr signatures in order to allow multiple verifiers to verify one proof, thereby boosting efficiency. The resulting non-interactive proof can be proven zero-knowledge in the random oracle model.

The concept of our solution is to use gradual and simultaneous translation of transcripts. The translation is called "gradual", since it is performed by quorum action, and each server's contribution to the computation is only a partial translation. I call it "simultaneous" since each server performs one partial decryption and one partial encryption, outputting such gradual re-encryptions without the cleartext ever being exposed. This approach makes all the partial translations simultaneous in the sense that no result is obtained until all the portions are accounted for.

Let us first consider a non-robust version of the proxy re-encryption, and then add on a proof to guarantee robustness. In this embodiment the ElGamal encryption algorithm is used.

Let $(a_1, b_1)$ be an ElGamal encryption of a message m with respect to a public key $y_1$, and let $x_1$ be the corresponding secret key, which is shared by the quorum of proxy servers using a threshold scheme. The quorun of proxy servers wish to compute the ElGamnal encryption $(a_2, b_2)$ of m with respect to the public key $y_2$. The quorum of proxy servers wish not to expose m to any set of dishonest proxy servers (or any other set of proxy servers); according to my assumptions, the quorum of proxy servers do not know the secret key $x_2$ of $y_2$.

For simplicity of denotation, assume that $x_{1j}$ is the Lagrange-weighted secret key of proxy server j with respect to a given active quorum Q; $y_{1j}=g^{x_{1j}}$ is the corresponding public key share. The proxy servers in the quorum perform the following computation:

1. Proxy server j selects a random value $\delta_j$ uniformly at random from $Z_q$, and computes $(c_j, d_j) = (b_1^{-x_{1j}} y_2^{\delta_j}, g^{\delta_j})$. This pair is sent to the other proxy servers.
2. The other proxy servers (or alternatively, a non-trusted gateway) compute the pair $(a_2, b_2) = (a_1 \Pi_{j \in Q} c_j, \Pi_{j \in Q} d_j)$. The pair $(a_2, b_2)$ is output.

The above protocol for proxy re-encryption is made robust by use of translation certificates.

Thus, after the first step, each proxy server j proves that proxy server j performed the right exponentiation. Here, proxy server j uses the public keys $(y_1, y_2) = (y_{1j}^{-1}, d_j)$, for "messages" $(m_1, m_2) = (b_1, g)$ and a "signature" $s = c_j$. Thus, in this step, proxy server j proves that $c_j = b_1^{-x_{1j}} y_2^{\delta_j}$ for $y_{1j} = g^{x_{1j}}$ and $d_j = g^{\delta_j}$, which proves that proxy server j's output is of the correct format.

As is standard, if any proxy server is claimed to be a cheater by a majority of the participating proxy servers, then this proxy server is replaced and the protocol restarted. Given that at least half of the participating proxy servers are honest, all dishonest proxy servers will be replaced after no more than k−1 attempts (which is the maximum number of dishonest proxy servers in my model). After this, the correct output will be produced. If there is a majority of cheaters in the quorum (but yet not a quorum of cheating proxy servers, according to my assumptions) then after the maximum number of failed attempts (in which dishonest proxy servers may exclude honest proxy servers) the largest common set of proxy servers during all the attempts will be declared dishonest, after which they are replaced, and the protocol restarted.

I want to produce a translation certificate, that is, a non-interactive proof that $a_1/b_1^{x_1} = a_2/b_2^{x_2}$, or in other words, a proof that $(a_1, b_1)$ and $(a_2, b_2)$ are encryptions of the same message, for secret decryption keys $x_1$ and $x_2$, respectively, of the two encryptions. The certificate must not leak any information to the verifier or to any non-quorum of prover servers. Also, it must not require knowledge of the second secret key, $x_2$, since this is not assumed to be known by the prover. Finally, it must be publicly verifiable. My solution will produce such certificates that are short, and whose length does not depend on the number of provers.

More specifically, I need to prove that $(a_2, b_2) = (a_1 b_1^{-x_1} y_2^\delta, g^\delta)$, for $y_1 = g^{x_1}$. In the proof, I will use a new generator, h, whose discrete log with respect to g is not known to any set of parties. I will also use a hash function hash, which is assumed to be collision free, and whose output is in $Z_q$. The proof has two components: 1) proving knowledge of the secret keys corresponding to two "public keys", and 2) proving that the output has the claimed relation to these two public keys. The version I show first is, for clarity, the single-prover version. I then explain how this is extended to a distributed prover, and how cheating provers are detected and traced.

In order to increase the readability of the protocol, I will rename certain variables to obtain a more uniform naming. To this extent, I will use the variable names $(z_1, z_2, w_1, w_2, \sigma, \mu_1, \mu_2)$ to mean $(y_1, b_2^{-1}, x_1, -\delta, a_2/a_1, b_1, y_2)$. Thus, wanting to prove that $a_2 = a_1 b_1^{-x_1} y_2^\delta$, for $(y_1, b_2) = (g^{x_1}, g^\delta)$ is the same as wanting to prove that $\sigma = \mu_1^{w_1} \mu_2^{w_2}$ for $(z_1, z_2) = (g^{w_1}, g^{w_2})$. In addition, [X]p means X mod p, where X is a function (for example, $g^\alpha$) and p is a positive prime number. For example, if p is 13 and X is 5×4, then (5×4)mod 13=7.

The following is illustrative of the protocol for generating translation certificates for a single-prover.

Initialization

P computes and outputs $(\bar{z}_1, \bar{z}_2) = (h^{w_1}, h^{w_2})$.

Part I

P selects $\alpha \epsilon_u Z_q$, and computes $(G, H) = (\text{hash}([g^\alpha]_p), \text{hash}([h^\alpha]_p))$.

P computes a pair of challenges $(\epsilon_1, \epsilon_2) = (\text{hash}(G, H, 1), \text{hash}(G, H, 2))$ P computes the response $\delta = [\alpha - \epsilon_1 w_1 - \epsilon_2 w_2]_q$. P outputs $(G, H, \delta)$.

Part II

P selects $\beta_1, \beta_2 \epsilon_u Z_q$, and computes $(F, M) = (\text{hash}([g^{\beta_1} h^{\beta_2}]_p), \text{hash}([\mu_1^{\beta_1} \mu_2^{\beta_2}]_p))$.

P computes a challenge $e = \text{hash}(F, M)$.

P computes the response $(d_1, d_2) = ([\beta_1 - ew_1]_q, [\beta_2 - ew_2]_q)$. P outputs $(F, M, d_1, d_2)$.

The translation certificate is the transcript $(\bar{z}_1, \bar{z}_2, G, H, \delta, F, M, d_1, d_2)$. The proof can be distributively generated, with tracing of dishonest provers, as shown in the attached Appendix. It is verified by the verifier V as follows:

Verification

V computes $(\epsilon_1, \epsilon_2) = (\text{hash}(G, H, 1), \text{hash}(G, H, 2))$, and accepts part I if and only if $G = \text{hash}([g^\delta z_1^{\epsilon_1} z_2^{\epsilon_2}]_p)$ and $H = \text{hash}([h^\delta \bar{z}_1^{\epsilon_1} \bar{z}_2^{\epsilon_2}]_p)$.

V computes $e = \text{hash}(F, M)$, and accepts part II if and only if $F = \text{hash}([g^{d_1} h^{d_2}(z_1 \bar{z}_2)^e]_p)$ and $M = \text{hash}([\mu_1^{d_1} \mu_2^{d_2} \sigma^e]_p)$.

If V accepted both part I and part II, then V outputs accept, otherwise V rejects.

Thus, the protocol for generation of translation certificates is correct (lemma 1), sound (lemma 2), and zero-knowledge in the random oracle model (lemma 3). In addition, the protocol for robust proxy re-encryption satisfies the previously stated requirements: it satisfies correctness (theorem 1), robustness (theorem 2), asymmetry (theorem 3), and privacy (theorem 4).

The following is illustrative of the protocol for generating translation certificates for multiple provers in a distributed environment.

Initialization $P_i$, $I \in Q$ has a (already Lagrange weighted with respect to Q) pair $(w_{1i}, w_{2i})$. $P_i$ computes and outputs $(\bar{z}_{1i}, \bar{z}_{2i}) = (h^{w_{1i}}, h^{w_{2i}})$.

Part I $P_i$, $I \in Q$ selects $\alpha_i \epsilon_u Z_q$, computes and publishes $(G_i, H_i) = (g^{\alpha_i}, h^{\alpha_i})$. $P_i$ computes $(G, H) = (\Pi_{j \in Q} G_j, \Pi_{j \in Q} H_j)$, and $(G, H) = (\text{hash}(G), \text{hash}(H))$.

$P_i$, $I \in Q$ computes a pair of challenges $(\epsilon_1 \epsilon_2) = (\text{hash}(G, H, 1), \text{hash}(G, H, 2))$.

$P_i$, $I \in Q$ computes and outputs $\delta_i = [\alpha_i - \epsilon_1 w_{1i} - \epsilon_2 w_{2i}]_q$. $P_i$ computes $\delta = \Sigma_{j \in Q} \delta_j$. The triple $(G, H, \delta)$ is output.

Part II $P_i I \in Q$ selects $\beta_{1i}, \beta_{2i} \epsilon_u Z_q$, computes and outputs $(F_i, M_i) = (g^{\beta_1} h^{\beta_2}, \mu_1^{\beta_1} \mu_2^{\beta_2})$.

$P_i$ computes $(F, M) = (\Pi_{j \in Q} F_j, \Pi_{j \in Q} M_j)$, and $(F, M) = (\text{hash}(F), \text{hash}(M))$.

$P_i$, $I \in Q$ computes a challenge $e = \text{hash}(F, M)$.

$P_i$, $I \in Q$ computes and outputs $(d_{1i}, d_{2j}) = ([\beta_{1i} - ew_{1i}]_q, [\beta_{2i} - ew_{2i}]_q)$.

$P_i$ computes $(d_1, d_2) = (\Sigma_{j \in Q} d_{1j}, \Sigma_{j \in Q} d_{2j})$. The quadruple $(F, M, d_1, d_2)$ is output.

Verification and Tracing (by Provers)

$P_i$ verifies that $G = \text{hash}([g^\delta z_1^{\epsilon_1} z_2^{\epsilon_2}]_p)$, $H = \text{hash}([h^\delta \bar{z}_1^{\epsilon_1} \bar{z}_2^{\epsilon_2}]_p)$, $F = \text{hash}([g^{d_1} h^{d_2}(z_1 \bar{z}_2)^e]_p)$ and $M = \text{hash}([\mu_1^{d_1} \mu_2^{d_2} \sigma^e]_p)$. If this holds, $P_i$ accepts the transcript, otherwise $P_i$ proceeds:

For all $j \in Q$, $P_j$ is replaced if one of the following equations is not satisfied:

$$G_j = g^{\delta_j} z_{1j}^{\epsilon_1} z_{2j}^{\epsilon_2}, H_j = h^{\delta_j} \bar{z}_{1j}^{\epsilon_1} \bar{z}_{2j}^{\epsilon_2}, F_j = g^{d_{1j}} h^{d_{2j}} (z_{1j} \bar{z}_{2j})^e, M_j = \mu_1^{d_{1j}} \mu_2^{d_{2j}} \sigma^e.$$

The generated transcripts are identical to those of the single-server case, and thus, the verification (by the verifier) is identical to what was previously presented.

The attached appendix contains the relevant Lemmas, Theorems and associated Proofs that form the basis of my inventive method and system.

What has been described is merely illustrative of the application of the principles of the present invention. Other arrangements and methods can be implemented by those skilled in the art without departing from the spirit and scope of the present invention.

Appendix

My proposed scheme for transformation of transcripts satisfies correctness (theorem 1), robustness (theorem 2), asymmetry (theorem 3), and privacy (theorem 4). I prove these theorems are true after proving the lemmas they build on are true.

The interactive scheme for proving valid exponentiation is correct (lemma 1), sound (lemma 2), and zero-knowledge (lemma 3).

Lemma 1. The protocol generating translation certificates is correct, that is, if the prover is honest, then the verifier will accept with an overwhelming probability.

Proof of Lemma 1. I assume that the prover is honest. Four equations have to be satisfied in order for the verifier to accept.

$1: g^\delta z_1^{\epsilon_1} z_2^{\epsilon_2} = g^{\alpha - \epsilon_1 w_1 - \epsilon_2 w_2} g^{w_1 \epsilon_1} g^{w_2 \epsilon_2} = g^\alpha = \text{hash}^{-1}(G)$.

$2: h^\delta \bar{z}_1^{\epsilon_1} \bar{z}_2^{\epsilon_2} = h^{\alpha - \epsilon_1 w_1 - \epsilon_2 w_2} h^{w_1 \epsilon_1} h^{w_2 \epsilon_2} = h^\alpha = \text{hash}^{-1}(H)$.

$3: g^{d_1} h^{d_2} (z_1 \bar{z}_2)^e = g^{\beta_1 - ew_1} h^{\beta_2 - ew_2} (g^{w_1} h^{w_2})^e = g^{\beta_1} h^{\beta_2} = \text{hash}^{-1}(F)$.

$4: \mu_1^{d_1} \mu_2^{d_2} \sigma^e = \mu_1^{\beta_1 - ew_1} \mu_2^{\beta_2 - ew_2} (\mu_1^{w_1} \mu_2^{w_2})^e = \mu_1^{\beta_1} \mu_2^{\beta_2} = \text{hash}^{-1}(M)$.

By the definition of G, H, F, M, these relations hold.

It can easily be seen that the robust and distributed version of the protocol for generating translation certificates is correct if the single-server version is.

Lemma 2. The protocol for generating translation certificates is sound, that is, it is only possible for the prover to correctly answer three different queries with a non-negligible probability if the claimed relationship holds, and the prover knows the secret keys. Normally, soundness is defined as the claimed relationship must hold if the prover can answer two queries with a non-negligible probability. However, since this is only to bound the probability of a verifier accepting an incorrect proof, any polynomial number works.

Proof of Lemma 2. Although not a formal proof, I assert the following proof outline to be true. I assume that it is not feasible to find hash collisions. Then, the only time the verifier will accept is if $g^\alpha = g^\delta z_1^{\epsilon_1} z_2^{\epsilon_2}$ and $h^\alpha = h^\delta \overline{z}_1^{\epsilon_1} \overline{z}_2^{\epsilon_2}$. I now further assume that the challenges are randomly generated. I consider the two parts of the proof independently:

Part I

Let $(\epsilon_1, \epsilon_2)$, $(\epsilon'_1, \epsilon'_2)$, and $(\epsilon''_1, \epsilon''_2)$ be three different pairs of challenges, and let $\delta$, $\delta'$, and $\delta''$ be the corresponding correct responses. Then, given that I have three equations for these, with common choices of $\alpha$, and I only have two unknowns ($w_1$ and $w_2$), I can solve the equations for these. Therefore, if the prover can answer three or more challenges with a non-negligible probability, the prover must know $w_1$ and $w_2$.

Part II

Using a similar argument to that above, if the prover can answer two different challenges e and e', then the prover can solve the response equations for $w_1$ and $w_2$.

For these two cases, therefore, being able to answer three or more possible challenges out of all possible challenges can be used to compute the secret key $w_1$, which corresponds to the secret key for decryption.

Lemma 3. The interactive scheme for proving valid exponentiation is zero-knowledge in the random oracle model. The verifier can simulate transcripts of the protocol that cannot be distinguished from real transcripts.

This can be shown by use of a standard rewinding argument in which the simulator commits to a dummy value w, learns $\alpha$, $\beta_1$, $\beta_2$, and then rewinds to commit to the "correct" value w. Given that it is not possible to find collisions for the verifier (corresponding to multiple possible values for $\alpha$, $\beta_1$, $\beta_2$) the simulation, which runs in polynomial time, produces transcripts that are indistinguishable from real transcripts. I note that finding collisions is only possible if the representation problem is easy, in which case it is easy to find discrete logarithms, and the protocol trivially becomes zero-knowledge by the removal of the "computational barrier."

Theorem 1. The transformation scheme satisfies correctness. If $E_1$ is an encryption of m with respect to $y_1$, then the output of the scheme will be $E_2$, an encryption of m with respect to, $y_2$, for a value $y_2$ chosen by the proxy.

Proof of Theorem 1. Although not a formal proof, I assert the following proof outline to be true. Assume, for example, that $(a_1, b_1) = (my_1^\gamma, g^\gamma)$, that is, $(a_1, b_1)$ is a valid ElGamal encryption of a message m with respect to the proxy's public key $y_1$. I have that $(c_j, d_j) = (b_1^{-x_{1j}} y_2^{\delta_j}, g^{\delta_j})$, for an already Lagrange-weighted (with respect to the quorum Q) secret key share $x_{1j}$ of proxy server j, and a random number $\delta_j$. Then, I have that $(a_2, b_2) = (a_1 \Pi_{j \in Q} c_j, \Pi_{j \in Q} d_j)$. I therefore have that $a_2 = a_1 b_1^{-x_1} y_2^\delta$, for $\delta = \Sigma_{j \in Q} \delta_j$ mod q, and $x_1 = \Sigma_{j \in Q} x_{1j}$ mod q. Recall that $y_1 = g^{x_1}$. Thus, $a_2 = my_2^\delta$, according to the decryption algorithm for ElGamal encryption. Since $b_2 = \Pi_{j \in Q} d_j = g^\delta$, I have that $(a_2, b_2)$ is a valid ElGamal encryption of the message m with respect to the public key $y_2$, and thus, the transformation protocol is correct. Likewise, the robust version, in which the proof of correct exponentiation is added, must also be correct.

Theorem 2. The scheme satisfies robustness. If any participating proxy outputs a transcript that would result in an incorrect end result, then the honest proxy servers will detect this, and will be able to determine the cheating proxy's identity.

Proof of Theorem 2. If any proxy server should use another public key $y_2$ for the secondary recipient than what was agreed upon, or another incoming encryption other than $E_1 = (a_1, b_1)$, then this will result in the other proxy servers (corresponding to the verifiers of the proof of correct exponentiation) detecting this cheating proxy server (given that the protocol for proving correct exponentiation is sound, which was shown in lemma 2). Given that there is a majority of honest proxy servers, they will force the replacement of the cheating proxy servers, after which the transformation protocol will be restarted (I note that this will not affect its simulability.) Therefore, a correct output will only be output when there is a quorum of honest proxy servers available among all the proxy servers, and there is no set of dishonest proxy servers that includes a quorum of proxy servers (which is my assumption).

Theorem 3. The scheme satisfies asymmetry. This is obvious given the specification of the protocol; the proxy servers never need any secret information corresponding to the public key $y_2$ of the secondary recipient, nor does the secondary recipient need any secret information apart from this secret key in order to decrypt the received transcript.

Theorem 4. The scheme satisfies privacy. Let A be a set of proxy servers not containing a quorum. A can simulate transcripts such that these cannot be distinguished by A from transcripts of the transformation protocol, other than with a negligible probability.

Proof of Theorem 4. Although not a formal proof, I assert the following proof outline to be true. Let $E_2$ be a value that cannot be distinguished by A from a valid re-encryption (according to the given public keys) of the input $E_1$. (For example, for ElGamal encryption, it is commonly believed that any pair of randomly chosen elements from $G_p$ may be chosen as such a value $E_2$, given no partial knowledge of the corresponding decryption key $x_2$.) Let us assume that the secret key $x_2$ needed to decrypt the transformed encryption is not known by any proxy servers. Focusing on the non-robust transformation protocol only, one can then show that the view of a set of proxy servers not containing a quorum can be simulated, following the (somewhat space-consuming) method used for proving the simulability of two related protocols, namely those for proactive key update and for distributed signature generation. The same result will be obtained when such a protocol is interleaved (a constant and low number of times) with a protocol that is zero-knowledge. Therefore, the robust transformation protocol has the property that a partial view (corresponding to the views of a set of proxy servers not containing a quorum) is simulable in p-time, and the simulated transcripts cannot be distinguished (by the same set of proxy servers) from real transcripts. This argument also holds for a serial concatenation of protocol executions (following the proof method in Herzberg, Jakobsson et al.), and thus, is valid even when cheating proxy servers corrupt the protocol and force a restart of the same.

In more detail, the simulator will compute transcripts according to the inputs given by A, and select transcripts for the appropriate distributions from the proxy servers not controlled by A. This is done so that the resulting output is $E_2$. The simulator then simulates the zero-knowledge proofs for the honest proxy servers (that is, those not controlled by A), giving transcripts showing that these transcripts are valid and correspond to the previously set outputs of these proxy servers. I note that it will not be possible for A to distinguish transcripts in a simulation where a false statement is "proven" from transcripts from a simulation of a true statement (and therefore also not from real transcripts.) If this were not the case, then it would not be hard to decide whether a given input is valid or not, without the interaction of the prover, which in turn would violate my computational assumption.

I claim:

1. A method for providing publicly verifiable translation certificates comprising the steps of:

receiving an input encryption having a first secret key;

outputting an output re-encryption of said input encryption, said output re-encryption having a second secret key; and generating a translation certificate that verifies said input encryption and said output re-encryption are encryptions of an identical message.

2. The method recited in claim 1, wherein said generating a translation certificate step further comprises the substeps of:

computing and outputting a first public key that corresponds to said first secret key; and verifying said output re-encryption has a correct relationship with said first public key and so a second public key.

3. The method as recited in claim 2, wherein said verifying said output re-encryption step further comprises the substeps of:

selecting a first random value;

computing a pair of challenges from a partial decryption of said input encryption;

computing a first response responsive to said computed pair of challenges; and outputting said partial decryption and said first response;

selecting a second random value;

computing a challenge from a partial re-encryption of said partial decryption;

computing a second response responsive to said computed challenge; and outputting said partial re-encryption and said second response.

4. The method recited in claim 3, wherein said generating said translation certificate step comprises the substep of:

combining said first public key, said second public key, said partial decryption, said first response, said partial re-encryption, and said second response in a transcript.

5. The method recited in claim 4 further comprising the substep of:

verifying said translation certificate is correct.

6. The method recited in claim 5, wherein said verifying said translation certificate step further comprises the substeps of:

re-computing a new pair of challenges from said partial decryption;

accepting a verifying knowledge step as correct, if said re-computed new pair of challenges equals said computed pair of challenges;

re-computing a new challenge from said partial re-encryption;

accepting said comparing said output re-encryption step as correct, if said re-computed new challenge equals said computed challenge; and outputting an acceptance if both said verifying knowledge step and said comparing said output re-encryption step are correct, otherwise outputting a rejection.

7. The method recited in claim 1, wherein said generating a translation certificate step further comprises the substeps of:

computing and outputting a first public key that corresponds to said first secret key;

verifying said output re-encryption has a correct relationship with said first public key and a second public key by each of a plurality of proxy servers; and verifying honesty of all of said plurality of proxy servers.

8. The method as recited in claim 7, wherein said verifying said output re-encryption step further comprises the substeps of:

selecting a first random value for each of said plurality of proxy servers;

computing a pair of challenges from a partial decryption of said input encryption for each of said plurality of proxy servers;

computing a first response responsive to said computed pair of challenges for each of said plurality of proxy servers;

outputting said partial decryption and said first response for each of said plurality of proxy servers;

selecting a second random value for each of said plurality of proxy servers;

computing a challenge from a partial re-encryption of said partial decryption for each of said plurality of proxy servers;

computing a second response responsive to said computed challenge for each of said plurality of proxy servers; and outputting said partial re-encryption and said second response for each of said plurality of proxy servers.

9. The method recited in claim 8, wherein said verifying honesty step further comprises the substeps of:

verifying said translation certificate; and if said translation certificate is valid, accepting all of said plurality of proxy servers are honest; and if said translation certificate is not valid, replacing each of said plurality of proxy servers whose partial decryption and said partial re-encryption are not both verified as correct.

10. The method recited in claim 8, wherein said comparing said output re-encryption step and said verifying honesty step are performed in parallel by each of said plurality of proxy servers, and said generating said translation certificate step further comprises the substep of:

combining said first public key, said second public key, said partial decryptions, said first response, said partial re-encryption, and said second response in a transcript.

11. The method recited in claim 8, wherein said comparing said output re-encryption step and said verifying honesty step are performed in serial by each of said plurality of proxy servers, and said generating said translation certificate step comprises the substep of:

combining said first public key, said second public key, said partial decryptions, said first response, said partial re-encryption, and said second response in a transcript.

12. The method recited in claim 10 further comprising the substep of:

verifying said translation certificate is correct.

13. The method recited in claim 12, wherein said verifying said translation certificate step further comprises the substeps of:

re-computing a new pair of challenges from said partial decryption;

accepting a proving knowledge step as correct, if said re-computed new pair of challenges equals said computed pair of challenges;

re-computing a new challenge from said partial re-encryption;

accepting said proving said output re-encryption step as correct, if said re-computed new challenge equals said computed challenge; and outputting an acceptance if both said proving knowledge step and said proving said output re-encryption step are correct, otherwise outputting a rejection.

14. The method recited in claim 11 further comprising the substep of:

verifying said translation certificate is correct.

15. The method recited in claim 14, wherein said verifying said translation certificate step further comprises the substeps of:

re-computing a new pair of challenges from said partial decryption;

accepting a proving knowledge step as correct, if said re-computed new pair of challenges equals said computed pair of challenges;

re-computing a new challenge from said partial re-encryption;

accepting said proving said output re-encryption step as correct, if said re-computed new challenge equals said computed challenge; and outputting an acceptance if both said proving knowledge step and said proving said output re-encryption step are correct, otherwise outputting a rejection.

16. A computer-readable medium having computer executable instructions for performing the steps comprising:

receiving an input encryption having a first secret key;

outputting an output re-encryption of said input encryption, said output re-encryption having a second secret key; and generating a translation certificate that verifies said input encryption and said output re-encryption are encryptions of an identical message.

17. The computer-readable medium of claim 16, wherein said generating a translation certificate step further comprises the substeps of:

computing and outputting a first public key that corresponds to said first secret key; and verifying said output re-encryption has a correct relationship with said first public key and a second public key.

18. The computer-readable medium of claim 17, wherein said verifying said output re-encryption step further comprises the substeps of:

selecting a first random value;

computing a pair of challenges from a partial decryption of said input encryption;

computing a first response responsive to said computed pair of challenges; and outputting said partial decryption and said first response;

selecting a second random value;

computing a challenge from a partial re-encryption of said partial decryption;

computing a second response responsive to said computed challenge; and outputting said partial re-encryption and said second response.

19. The computer-readable medium of claim 18, wherein said generating said translation certificate step comprises the substep of:

combining said first public key, said second public key, said partial decryption, said first response, said partial re-encryption, and said second response in a transcript.

20. The computer-readable medium of claim 19, having further computer executable instructions for performing the substep comprising:

verifying said translation certificate is correct.

21. The computer-readable medium of claim 20, wherein said verifying said translation certificate step further comprises the substeps of:

re-computing a new pair of challenges from said partial decryption;

accepting a verifying knowledge step as correct, if said re-computed new pair of challenges equals said computed pair of challenges;

re-computing a new challenge from said partial re-encryption;

accepting said comparing said output re-encryption step as correct, if said re-computed new challenge equals said computed challenge; and outputting an acceptance if both said verifying knowledge step and said comparing said output re-encryption step are correct, otherwise outputting a rejection.

22. The computer-readable medium of claim 16, wherein said generating a translation certificate step further comprises the substeps of:

computing and outputting a first public key that corresponds to said first secret key;

verifying said output re-encryption has a correct relationship with said first public key and a second public key by each of a plurality of proxy servers; and verifying honesty of all of said plurality of proxy servers.

23. The computer-readable medium of claim 22, wherein said verifying said output re-encryption step further comprises the substeps of:

selecting a first random value for each of said plurality of proxy servers;

computing a pair of challenges from a partial decryption of said input encryption for each of said plurality of proxy servers;

computing a first response responsive to said computed pair of challenges for each of said plurality of proxy servers;

outputting said partial decryption and said first response for each of said plurality of proxy servers;

selecting a second random value for each of said plurality of proxy servers;

computing a challenge from a partial re-encryption of said partial decryption for each of said plurality of proxy servers;

computing a second response responsive to said computed challenge for each of said plurality of proxy servers; and outputting said partial re-encryption and said second response for each of said plurality of proxy servers.

24. The computer-readable medium of claim 23, wherein said verifying honesty step further comprises the substeps of:

verifying said translation certificate; and if said translation certificate is valid, accepting all of said plurality of proxy servers are honest; and if said translation certificate is not valid, replacing each of said plurality of proxy servers whose partial decryption and said partial re-encryption are not both verified as correct.

25. The computer-readable medium of claim 23, wherein said comparing said output re-encryption step and said verifying honesty step are performed in parallel by each of said plurality of proxy servers, and said generating said translation certificate step further comprises the substep of:

combining said first public key, said second public key, said partial decryptions, said first response, said partial re-encryption, and said second response in a transcript.

26. The computer-readable medium of claim 23, wherein said comparing said output re-encryption step and said verifying honesty step are performed in serial by each of said plurality of proxy servers, and said generating said translation certificate step comprises the substep of:

combining said first public key, said second public key, said partial decryptions, said first response, said partial re-encryption, and said second response in a transcript.

27. The computer-readable medium of claim 25 further comprising the substep of:

verifying said translation certificate is correct.

28. The computer-readable medium of claim 27, wherein said verifying said translation certificate step further comprises the substeps of:

re-computing a new pair of challenges from said partial decryption;

accepting a proving knowledge step as correct, if said re-computed new pair of challenges equals said computed pair of challenges;

re-computing a new challenge from said partial re-encryption;

accepting said proving said output re-encryption step as correct, if said re-computed new challenge equals said computed challenge; and outputting an acceptance if both said proving knowledge step and said proving said output re-encryption step are correct, otherwise outputting a rejection.

29. The computer-readable medium of claim 26, further comprising the substep of:

verifying said translation certificate is correct.

30. The computer-readable medium of claim 29, wherein said verifying said translation certificate step further comprises the substeps of:

re-computing a new pair of challenges from said partial decryption;

accepting a proving knowledge step as correct, if said re-computed new pair of challenges equals said computed pair of challenges;

re-computing a new challenge from said partial re-encryption;

accepting said proving said output re-encryption step as correct, if said re-computed new challenge equals said computed challenge; and outputting an acceptance if both said proving knowledge step and said proving said output re-encryption step are correct, otherwise outputting a rejection.

31. A method for electronically providing publicly verifiable translation certificates comprising the steps of:

receiving an input encryption from a primary recipient by a plurality of proxy servers;

generating an output re-encryption of said input encryption by said plurality of proxy servers, said output re-encryption having a second secret key;

generating a translation certificate that proves said input encryption and said output re-encryption are encryptions of an identical message; and transmitting said output re-encryption and said translation certificate to at least one secondary recipient.

32. The method of claim 31, wherein said plurality of proxy servers is equal to one, said creating said output re-encryption step comprises the substep of:

combining a second secret key with a partial re-encryption of a partial decryption of said input encryption to create said output re-encryption.

33. The method of claim 31, wherein said plurality of proxy servers is greater than one, said creating said output re-encryption step comprises the substeps of:

combining each of said plurality of proxy servers partial re-encryptions of each of said plurality of proxy servers own partial decryptions of said input encryption into a combined partial re-encryption; and combining a second secret key with said combined partial re-encryption to create said output re-encryption.

* * * * *

UNITED STATES PATENT AND TRADEMARK OFFICE
CERTIFICATE OF CORRECTION

PATENT NO. : 6,687,822 B1
DATED : February 3, 2004
INVENTOR(S) : Markus Bjorn Jakobsson It is certified that error appears in the above-identified patent and that said Letters Patent is hereby corrected as shown below:

<u>Title page,</u>
Insert Item -- [73], Assignee, Lucent Technologies Inc., Murray Hill, N.J. --

Signed and Sealed this

Tenth Day of August, 2004

JON W. DUDAS
*Acting Director of the United States Patent and Trademark Office*